April 16, 1957  W. K. GANNETT  2,788,939
EXPOSURE COUNTER FOR CAMERAS
Filed Feb. 1, 1952

INVENTOR.
WRIGHT K. GANNETT
BY
Harry M. Saragovitz
Attorney

United States Patent Office 2,788,939
Patented Apr. 16, 1957

2,788,939

EXPOSURE COUNTER FOR CAMERAS

Wright K. Gannett, Davenport, Iowa, assignor to the United States of America as represented by the Secretary of the Army Application February 1, 1952, Serial No. 269,424

3 Claims. (Cl. 235—91)

This invention relates to a counter mechanism for photographic equipment and is particularly adapted for use upon small cameras such as miniature or subminiature type wherein multiple exposures are made upon a strip of film.

The mechanism is automatic in counting the number of exposures made and is automatically rendered inoperative at the end of any selected number of exposures upon removal of the film. When rendered inoperative it is impossible to start an exposure counting cycle by actuation of any other elements of the camera such as resetting or operating its shutter or film advancing means. Thus the accuracy of the device is positively assured.

The counter mechanism coacts with the film transport means of the camera utilizing the accurately repeated film transport cycle to move the counter indicating means an exact amount equal to the numbered divisions upon the indicating dial.

The true relationships between the elements of the counting device and those of the camera are maintained by inter-meshing gear teeth while the ratio of movement between the inter-meshing elements is calculated to move the counter dial the correct amount each time the film transporting means is actuated.

The film used in the camera is contained in a suitable receptacle or cassette which is received in a chamber provided therefor within the camera. Means are provided which will be described in detail hereinafter which is actuated by the insertion of the cassette to cause inter-meshing of two of the driving elements extending between the camera's resetting and film transport mechanism to the counter dial.

After the desired number of exposures have been made the film is withdrawn which automatically disengages the inter-meshed elements thus freeing the counter dial which is restored to its zero position by means of a spring device thus the counting mechanism is automatically reset and ready to again be put into operation by the insertion of another film cassette.

It is a primary object of the invention to provide an exposure counting means which depends for its actuation upon a direct positive mechanical driving connection with the film transporting means upon the camera.

A further object of the invention is to provide an exposure counter having maximum simplicity and durability.

A further object of the invention is to provide an exposure counting device which at all times during its counting cycle is locked against the possibility of accidentally becoming out of adjustment.

A still further object of the invention is to provide a counter mechanism which is operative only when film is in the camera.

A still further object of the invention is to provide a completely automatic reliable exposure counting means which will count any number of total exposures and automatically complete its cycle when the film is removed from the camera.

Other objects and features of the invention will more fully appear hereinafter and will be particularly pointed out in the claims.

To provide a better understanding of the invention a specific embodiment thereof will be described in connection with the accompanying drawings in which.

Figure 1:
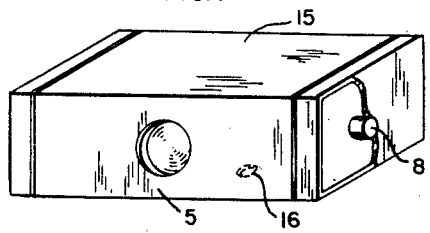
Fig. 1 is a perspective view of the camera.

The invention is adaptable to many types of cameras and especially to small portable hand type cameras wherein a plurality of successive exposures are made upon a strip of film and in which means are provided for measuring a section of film for each exposure.

The structure of the counter mechanism permits it to be designed in extremely compact form. This structure lends itself to application to miniature cameras wherein compactness is a major consideration. By way of illustration, therefore, the mechanism will be described as applied to a small hand camera having the casing 5 within which the mechanism is inclosed. A body or frame 6 is secured within the casing and serves to support and movably receive the active elements of the camera.

The invention may be applied to a wide variety of film advancing means and is shown specifically herein in connection with a linearly movable member or plate 7 which serves to advance the film and wind the shutter spring after each exposure. The sliding plate 7 is guided for linear motion lengthwise along body 6 in any suitable manner and motion is imparted thereto by a manual actuating means such as the plunger 8 which is extensible to a position outside the camera casing thru a suitable aperture therein. Actuation of the plate is accomplished by pushing the plunger 8 inwardly. Suitable means, desirably, may be provided but is not herein shown for holding the plunger in its innermost position when not in use. Spring means is provided to return the sliding plate 7 to its inactive position after each film advancing movement. An example of a suitable film advancing mechanism is shown and described in my copending application Serial No. 269,425, filed February 1, 1952, entitled "Exposure Timing Device for Cameras."

The film advancing means is not shown herein since it forms no part of the present invention. The full stroke of the plunger 8 advances the film one frame.

In cameras of the type under consideration it is usual to convert the linear motion used for advancing the film to rotary motion for winding the spring used to actuate the timer. Since the degree of this motion is predetermined and constant it forms a suitable source from which to drive the counter mechanism.

Figure 2:
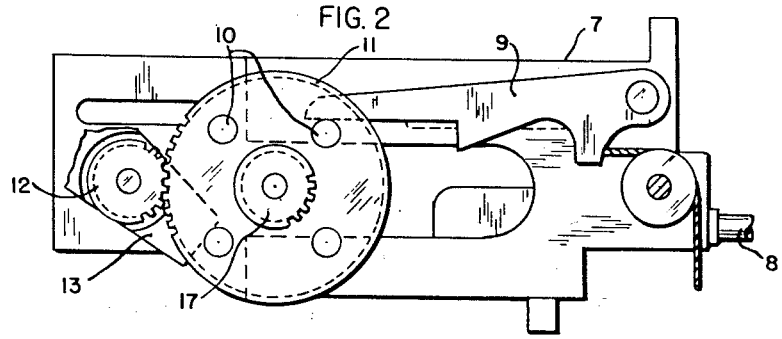
Fig. 2 is a detailed view of the mechanism for simultaneously resetting all of the camera elements to permit another exposure to be made and to actuate the counter dial.
Figure 3:
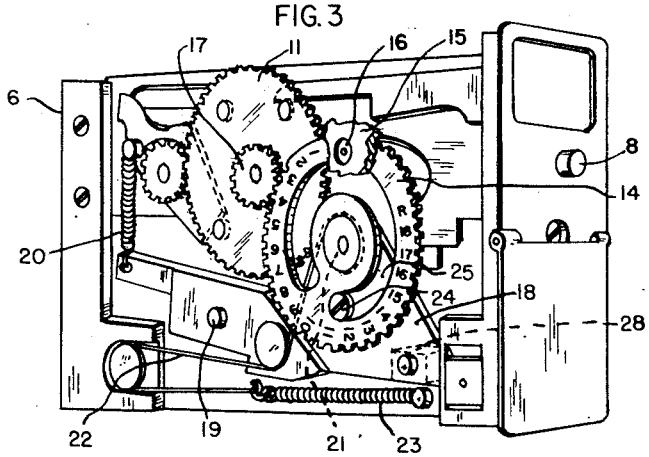
Fig. 3 is a perspective view illustrating the major elements of the counting mechanism.
Figure 4:
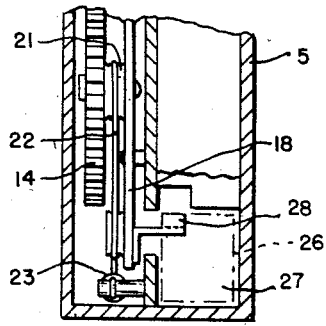
Fig. 4 is a detailed view illustrating the means for automatically starting and completing the counting cycle.

The sliding plate 7 is provided with a pivoted pawl member 9 secured to the plate and adapted to engage successively a plurality of studs 10 rigidly mounted at equally spaced intervals in the peripheral portion of a gear 11. The 11 is rotatably mounted upon the camera body or frame. During the resetting cycle the pawl engages one of the studs 10 and rotates the gear 11 a fraction of one revolution. In the particular construction shown there are four studs 10. Therefore, the pawl 9 is constructed and adjusted to rotate the gear 11 one quarter revolution for each complete camera resetting cycle. The gear 11 meshes with and drives a pinion 12 rotatably mounted in the camera frame and connected to the timer actuating spring to rewind the same in the conventional manner. It will become apparent hereinafter that due to the presence of the exposure counter mechanism the gear 11 tends to rotate clockwise as shown in Fig. 2 which is opposite to its direction of rotation during the resetting operation. To prevent retracted movement of the gear when the plate 7 is retracted a stop pawl 13 is provided which is yieldingly held in a position where one of the studs 10 engages its stopping face to prevent retracted movement of the gear.

The rotating movement of the gear 11 is utilized to actuate the counting means. The counter consists of a dial 14 freely rotatably mounted and bearing numbers upon its outer peripheral portion representing the maximum number of exposures available on the film strip used. The dial 14 is positioned closely adjacent the outer wall 15 of the camera casing with its face bearing the numbers in such position that the numbers may readily be seen thru a small aperture 16 in the outermost portion of the camera casing. The aperture 16 is of such size that only one number at a time may be seen. If desired, a suitable filter may be provided to cover the aperture 16 to exclude actinic light from the inside of the camera.

Any suitable means may be employed to drive the counter dial 14 from the gear 11. As shown the gear 11 has secured thereto and in axial alignment therewith a pinion 17 which meshes with gear teeth formed upon the periphery of the dial 14. The driving ratio between the dial and the pinion is calculated to produce a motion in the dial equal to the angular distance between each of the numbers thereon each time the gear 11 is moved during the resetting of the camera. After each exposure and resetting operation of the camera the number of the exposure is indicated by the numbers as they appear successively at the window 16.

When the total number of exposures has been made and the film is withdrawn automatic means are provided for restoring the counter dial to its initial position. To do this the dial has a rotative force applied thereto tending at all times to rotate it into its initial position but is held from such motion by reason of its intermeshing relation with the pinion 17. Means are provided for automatically disengaging the dial 14 from its driving relationship with the pinion 17 when the film is removed from the camera. To accomplish this result the dial is bodily moved a short distance to remove the teeth thereon from intermeshing relationship with the pinion 17. To provide this bodily motion the dial is rotatably mounted upon a swinging support 18. The support 18 is in the form of a flat lever pivoted at 19 upon the camera body and its position is determined by the presence or absence of the film cassette in the camera. A spring 20 acting upon the free end of the member 18 tends to rotate it clockwise which tends to disengage the dial from the pinion 17 while the act of inserting the film cassette rotates the member 18 in a counter-clockwise direction which causes the dial to mesh with the gear 17 in a manner to be described in more detail hereinafter.

Any suitable means may be employed to restore the dial to its initial position. As shown herein the dial is provided with a drum portion 21 around which is wound a cord 22 which in turn has its free end connected to a tension spring 23 anchored to the camera body. The cord 22 is so arranged that it will drive the dial 14 in the proper direction toward its initial position. Desirably, the cord is passed over directional sheaves to provide for locating the spring in a favorable position where it will avoid interference with the motion of other elements of the mechanism and also to minimize the leverage component of the spring tending to move the member 18. When the dial is disengaged from the pinion it will thus immediately return to its initial position which is positively determined by a stop 24. The stop is fixed in the body of the camera and extends into an arcuate slot 25 in the dial. The slot is so positioned that one end thereof engages the stop when the dial is in its initial position while the other end of the slot will engage the stop when the dial has reached the end of its counting cycle. Thus, the fact that the whole strip of film has been exposed is indicated to the operator.

The swinging support member 18 bearing the dial 14 is held in position causing the teeth on the dial to mesh with the pinion 17 by the presence of the film container or cassette 26 which is received within a compartment 27 in the camera. To establish this condition the member 18 is provided with a tongue 28 which projects into the compartment 27 when no film is present therein and at this time, as above explained, the counter dial is disengaged from the pinion 17 and has been restored to its initial position.

When, however, the cassette has been pushed into its compartment its casing engages the tongue 28 moving the member 18 and the dial 14 bodily until the dial meshes with the pinion thus preparing the counter for indicating the correct number of exposures. The position of the stop 24 may be made slightly adjustable to accurately position the dial in a predetermined initial position to insure that it will always make proper engagement with the pinion 17.

As above described, when the film cassette is removed the spring 20 disengages the dial from the pinion and the dial automatically returns to its initial position. In this connection one of the special advantages of the invention should be pointed out. In most exposure counter systems of the type described herein the counter has a definite fixed cycle including a predetermined unchangeable total number of exposures. The present invention will count a total of any number of exposures after which its counting cycle will automatically be ended and the counter made ready for a new cycle in the manner described above.

Such a property of the mechanism is advantageous in many ways. For example, it may be found necessary to remove the film strip before all exposures have been made or it may be desired to use film strips having different total numbers of exposures. The present invention automatically restores itself after any number of exposures have been made. In cameras without this feature it is necessary to manually restore the counter mechanism in some way if its predetermined complete cycle has not been completed by successive exposures and reset cycles.

What is claimed is:

1. In a camera having film transporting means and adapted for use with a disposable strip film holding device, a compartment in said camera to receive said film holding device in a predetermined position, an exposure counting mechanism comprising a rotatable counter dial having spaced numerals thereon, dial actuating means driven by said film transporting mechanism and having a measured movement which is a function of the length of film used for each exposure, means including intermeshing gear teeth connecting said dial actuating means to said dial and moving it a distance equal to successive numerals for each film advance, clutching means acting to hold the teeth on said dial and its actuating member intermeshed while said film holding means is in said compartment, automatic means to disengage said dial from its driving means when said disposal film holding means is removed and automatic means acting to restore said dial to its zero position when it becomes disengaged.

2. In a camera having film transporting means and adapted for use with a disposable strip film holding device, a compartment in said camera to receive said film holding device in a predetermined position, an exposure counting mechanism comprising a rotatable counting dial having indicating numerals thereon, dial actuating means driven by said film transporting means and having a movement which is a function of the length of film used for each exposure, engageable gear teeth for driving said dial from its driving member clutching means for engaging and disengaging the dail from its driven member an abutment on said clutching means projecting into said compartment when no film holding device is present therein and positioned to be engaged by disposable film holding means when it is inserted into said compartment to intermesh said gear teeth and automatic means to return said dial to zero position when said teeth are disengaged.

3. In a camera having film advancing means and adapted for use with a disposable strip film holding device, a compartment in said camera to receive said film holding device in a predetermined position, an exposure counter mechanism comprising a rotatable counting dial having indicating numerals thereon, dial actuating means connected to said film transporting means and having a measured movement which is a function of the length of the film used for each exposure, a geared drive between said dial actuator and said dial, a pivoted support for said dial arranged to swing the dial into and out of intermeshing relation with its driving means, spring means urging said dial support into disengaged position, an abutment projecting from said dial support extending into said compartment whereby when said film holding device is in operating position said dial will be intermeshed with its driving member and when said film holder is removed will be disengaged therefrom and automatic means acting to return said dial to zero position when said film holding device is removed.

References Cited in the file of this patent

UNITED STATES PATENTS

| | | |
|---|---|---|
| 74,911 | Grover | Feb. 25, 1868 |
| 863,997 | John | Aug. 20, 1907 |
| 1,352,973 | Kimball | Sept. 14, 1920 |
| 1,620,040 | Schade | Mar. 8, 1927 |
| 2,198,708 | Thomas | Apr. 30, 1940 |
| 2,401,682 | French | June 4, 1946 |
| 2,464,790 | Bolsey | Mar. 22, 1949 |